Figure 1:
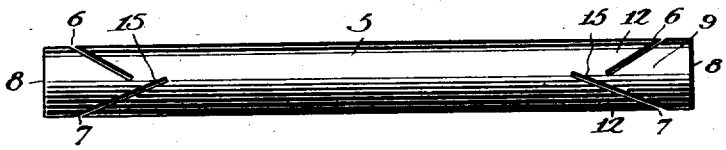

C. E. EVANS.

DOWEL.

APPLICATION FILED APR. 5, 1915.

Reissued May 11, 1915. 13,915.

*Witnesses:*

H. P. Jennings

B. M. Kent

*Inventor:*

Charles E. Evans by Foster Freeman Watson & Coit

Attys.

UNITED STATES PATENT OFFICE.

CHARLES E. EVANS, OF WEED, CALIFORNIA.

DOWEL.

13,915. Specification of Reissued Letters Patent. Reissued May 11, 1915.

Original No. 1,060,543, dated April 29, 1913, Serial No. 728,649. Application for reissue filed April 5, 1915. Serial No. 19,391.

*To all whom it may concern:*

Be it known that I, CHARLES E. EVANS, a citizen of the United States, and a resident of Weed, in the county of Siskiyou and State of California, have invented a new and Improved Dowel, of which the following is a full, clear, and exact description.

My invention has for its object to provide a dowel with cuts therein to form a wedge member at the end of the dowel, the wedge member being integral with the dowel, so that it may be inserted with the dowel into a hole in a member which is to be secured by the dowel. When the member to be secured has the bottom of the hole therein driven against the end of the dowel, it will force the wedge member into the adjacent portions of the dowel, and it will spread the dowel and force it laterally into the member to be secured at the sides of the hole.

Additional objects of my invention will appear in the following complete specification, in which the preferred form of the invention is disclosed.

In the drawings similar characters of reference indicate corresponding parts in all the views, in which—

Figure 2:
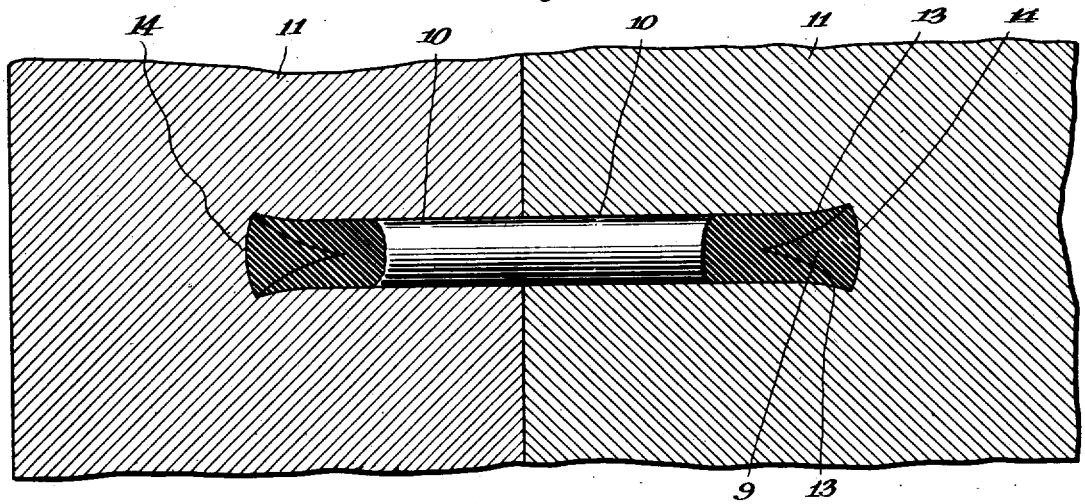
Figure 3:
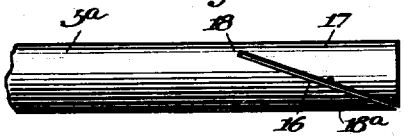
Figure 4:
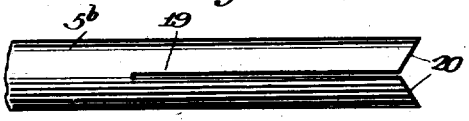
Figure 5:
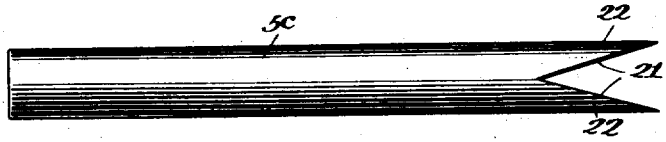

Figure 1 is a side elevation of the dowel; Fig. 2 is a sectional view of two members which are connected by the dowel; and Figs. 3, 4 and 5 are views, showing modified forms of my invention.

There is always difficulty in securing members together by dowels, so that they will remain secure under varying conditions, and this is especially true when the dowel is of wood and is inserted in a hole disposed at right angles to the grain of a wooden member in which the hole for the dowel is made. With my invention this difficulty is overcome, for the wedge or end member formed at the end of the dowel serves to spread the dowel, and force it into the member at the sides of the hole. The wedge member is made by making two cuts in the dowel, adjacent one of its ends, the cuts being made at an angle to each other, and converging away from the said end of the dowel, with one of the cuts extending farther from the said end than the other cut, so that the wedge member will split down from the short cut to the long cut, which will give the wedge member some movement before it strikes the adjacent V-shaped portion of the dowel, which the wedge member will force into the member to be secured at the sides of the hole made therein, for receiving the dowel.

By referring to the drawings it will be seen that the dowel 5 has a cut 6 therein, and a cut 7 therein, at each end, the cuts converging away from the ends 8, with the cuts 7 extending farther from the said end than the cut 6. The cuts 6 and 7 serve to form the wedge members 9, which, when the dowel is inserted in the holes 10 of the members 11, will serve to force laterally the portions 12 of the dowel, so that they will be driven into the sides of the hole 10, at the places 13.

In using this dowel, the combined length of the holes 10 in the two members 11, should be shorter than the dowel 5, before it is inserted in the said holes, so that when the members 11 are pressed together by a door clamp or similar device, the bottoms 14 of the holes 10 will press against the ends 8 of the dowel 5, to break the portions 15 of the dowel 5, between the wedge members 9 and the central or main part of the dowel. This will give the wedge members 9 some movement before they act on the portions 12 of the dowel 5, adjacent the cuts 6 and 7, to force the said portions 12 into the members 11 at the places 13 shown in Fig. 2 of the drawings.

In Fig. 3 I show a modified form of my invention, in which the dowel $5^a$ has an obliquely disposed slot 16, made therein, to form the wedge member 17. When this form of the invention is used, the wedge member 17 will be broken from the main part of the dowel $5^a$ at the point 18, so that the wedge member 17 will force the portion $18^a$ of the dowel outward or laterally, and into the side of the member at the hole, in which the dowel $5^a$ is inserted.

In the form of the invention shown in Fig. 4 of the drawings the dowel $5^b$ is provided, with a longitudinal slot 19, and surfaces 20, at its end, which diverge from the said slot 19. With this form of the invention these surfaces 20 will engage the member at the bottom of the hole, in which the dowel $5^b$ is inserted, and the member will force the dowel $5^b$ outwardly at the surfaces 20, this being permitted by the longitudinal slot 19.

In the form of the invention shown in Fig. 5 of the drawings, there is a V-shaped cut 21, which is made in the dowel pin $5^c$. When this form of the invention is used, the member at the end of the hole in which the dowel $5^e$ is inserted, will force the portions 22 laterally, and into the member in which the hole is made, for firmly securing the dowel thereto.

Having thus described my invention, I claim as new and desire to secure by Letters Patent:—

1. A dowel having a cut therein at an angle to the axis of the dowel, the cut making the portion beyond the cut subject to fracture upon the driving of the dowel, and forming a wedge member at one side of the cut for the purpose specified.

2. A dowel having an end partially severed, and subject to fracture, the end having a surface, disposed at an angle to the side of the dowel, next to a surface, on the adjacent portion of the dowel, which is also disposed at an angle to the side of the dowel.

3. A dowel having two cuts therein, converging from one end of the dowel, the said dowel being subject to fracture between the cuts, to form the said end of the dowel into a wedge member.

4. A dowel having two cuts converging from one end of the dowel, one of the cuts extending a greater distance from the said end of the dowel than the other cut, the dowel being subject to fracture between the cuts.

5. A dowel having two cuts therein, converging from an end of the dowel, one of the cuts extending a greater distance from the said end of the dowel than the other cut, the dowel being subject to fracture between the cuts, to form the said end of the dowel into a wedge member.

6. In a device of the class described, a member having a partially severed end with a wedge surface, the member being subject to fracture beyond its severed portion to form the said end into a wedge.

7. A dowel having at one or both of its ends an attached wedge which has its connection with the body of the dowel adapted to be broken, whereby the wedge will expand a portion of the body of the dowel upon engagement with the bottom of an opening into which the dowel is driven.

8. The combination with two members to be secured together in abutting relation and having alined openings for a dowel, of a dowel longer than the combined length of said openings and having longitudinally extending slits in its end portions which cause said portions to be expanded laterally and the dowel shortened by the engagement of the ends of the dowel with the bottoms of said openings, when said members are forced into abutting relation.

9. The combination with two members to be secured together in abutting relation and having alined openings for a dowel, of a dowel having integrally formed wedges at the ends thereof, said wedges being arranged between converging surfaces of the dowel and the original length of the dowel including the wedges being greater than the combined length of said openings, whereby said wedges are driven into the dowel and expand the ends thereof by engagement with the bottoms of said openings when said members are forced into abutting relation.

In testimony whereof I have signed my name to this specification in the presence of two subscribing witnesses.

CHARLES E. EVANS.

Witnesses:
J. G. CATCHETT,
H. J. BARRINGTON.